United States Patent
Wu

(10) Patent No.: US 8,515,052 B2
(45) Date of Patent: Aug. 20, 2013

(54) PARALLEL SIGNAL PROCESSING SYSTEM AND METHOD

(76) Inventor: Wai Wu, Massapequa, NY (US)

( * ) Notice: Subject to any disclaimer, the term of this patent is extended or adjusted under 35 U.S.C. 154(b) by 1280 days.

(21) Appl. No.: 12/337,236

(22) Filed: Dec. 17, 2008

(65) Prior Publication Data

US 2009/0154690 A1 Jun. 18, 2009

Related U.S. Application Data

(60) Provisional application No. 61/014,106, filed on Dec. 17, 2007.

(51) Int. Cl.
*H04M 3/00* (2006.01)
*H04M 5/00* (2006.01)

(52) U.S. Cl.
USPC .......................... 379/284; 379/286; 379/287

(58) Field of Classification Search
USPC .................... 379/390.02, 386, 382, 283, 284, 379/286, 287
See application file for complete search history.

(56) References Cited

U.S. PATENT DOCUMENTS 7,003,093 B2 * 2/2006 Prabhu et al. ............. 379/390.02
7,043,006 B1 5/2006 Chambers et al.

OTHER PUBLICATIONS

Annex to ITU Operational Bulletin No. 781-1.II.2003.

* cited by examiner

*Primary Examiner* — Gerald Gauthier
*Assistant Examiner* — Simon King
(74) *Attorney, Agent, or Firm* — Steven M. Hoffberg; Ostrolenk Faber LLP

(57) ABSTRACT

A system and method for processing a plurality of channels, for example audio channels, in parallel is provided. For example, a plurality of telephony channels are processed in order to detect and respond to call progress tones. The channels may be processed according to a common transform algorithm. Advantageously, a massively parallel architecture is employed, in which operations on many channels are synchronized, to achieve a high efficiency parallel processing environment. The parallel processor may be situated on a data bus, separate from a main general purpose processor, or integrated with the processor in a common board or integrated device. All, or a portion of a speech processing algorithm may also be performed in a massively parallel manner.

20 Claims, 3 Drawing Sheets

PARALLEL SIGNAL PROCESSING SYSTEM AND METHOD

BACKGROUND

1. Field of the Invention

The invention relates to the field of real time digital audio processing, particularly in a telephony switch context.

2. Background of the invention

Existing telephone systems, such as the Calltrol Object Telephony Server (OTS™), tend to require relatively expensive special purpose hardware to process hundreds of voice channels simultaneously. More information about this system can be found at www.calltrol.com/newsolutionsforoldchallenges.pdf, www.calltrol.com/crmconvergence_saleslogix-.pdf, and www.calltrol.com/CalltrolSDKWhitepaper6-02.pdf, each of which is expressly incorporated herein by reference in its entirety.

In many traditional systems, a single dedicated analog or digital circuit is provided for each public switch telephone network (PSTN) line. See, e.g., Consumer Microcircuits Limited CMX673 datasheet, Clare M-985-01 datasheet. In other types of systems, the call progress tone analyzer may be statistically shared between multiple channels, imposing certain limitations and detection latencies.

Digital signal processor algorithms are also known for analyzing call progress tones (CPT). See, e.g., Manish Marwah and Sharmistha Das, "UNICA—A Unified Classification Algorithm For Call Progress Tones" (Avaya Labs, University of Colorado), expressly incorporated herein by reference.

Call progress tone signals provide information regarding the status or progress of a call to customers, operators, and connected equipment. In circuit-associated signaling, these audible tones are transmitted over the voice path within the frequency limits of the voice band. The four most common call progress tones are: Dial tone; Busy tone; Audible ringback; and Reorder tone. In addition to these, there are a number of other defined tones, including for example the 12 DTMF codes on a normal telephone keypad. There may be, for example, about 53 different tones supported by a system. A call progress tone detector, may additionally respond to cue indicating Cessation of ringback; Presence/cessation of voice; Special Information Tones (SITs); and Pager cue tones. Collectively, call progress tones and these other audible signals are referred to as call progress events. Call progress tone generation/detection in the network is generally based on a Precise Tone Plan. In the plan, four distinctive tones are used singly or in combination to produce unique progress tone signals. These tones are 350 Hz, 440 Hz, 480 Hz and 620 Hz. Each call progress tone is defined by the frequencies used and a specific on/off temporal pattern.

The ITU-T E.180 and E.182 recommendations define the technical characteristics and intended usage of some of these tones: busy tone or busy signal; call waiting tone; comfort tone; conference call tone; confirmation tone; congestion tone; dial tone; end of three-party service tone (three-way calling); executive override tone; holding tone; howler tone; intercept tone; intrusion tone; line lock-out tone; negative indication tone; notify tone; number unobtainable tone; pay tone; payphone recognition tone; permanent signal tone; pre-emption tone; queue tone; recall dial tone; record tone; ringback tone or ringing tone; ringtone or ringing signal; second dial tone; special dial tone; special information tone (SIT); waiting tone; warning tone; Acceptance tone; Audible ring tone; Busy override warning tone; Busy verification tone; Engaged tone; Facilities tone; Fast busy tone; Function acknowledge tone; Identification tone; Intercept tone; Permanent signal tone; Positive indication tone; Re-order tone; Refusal tone; Ringback tone; Route tone; Service activated tone; Special ringing tone; Stutter dial tone; Switching tone; Test number tone; Test tone; and Trunk offering tone. In addition, signals sent to the PSTN include Answer tone; Calling tone; Guard tone; Pulse (loop disconnect) dialing; Tone (DTMF) dialing, and other signals from the PSTN include Billing (metering) signal; DC conditions; and Ringing signal. The tones, cadence, and tone definitions, may differ between different countries, carriers, atypes of equipment, etc. See, e.g., Annex to ITU Operational Bulletin No. 781-1.II.2003. Various Tones Used In National Networks (According To ITU-T Recommendation E.180) (March/1998).

Characteristics for the call progress events are shown in Table 1.

TABLE 1

| Call Progress Event Characteristics Name | Frequencies (Hz) | Temporal Pattern | Event Reported After |
|---|---|---|---|
| Dial Tone | 350 + 440 | Steady tone | Approximately 0.75 seconds |
| Busy Tone | 480 + 620 | 0.5 seconds on/ 0.5 seconds off | 2 cycles of precise, 3 cycles of nonprecise |
| Detection Audible Ringback Cessation | 440 + 480 — — | 2 seconds on/ 4 seconds off — | 2 cycles of precise or nonprecise 3 to 6.5 seconds after ringback detected |
| Reorder | 480 + 620 | 0.25 seconds on/ 0.25 seconds off | 2 cycles of precise, 3 cycles of nonprecise |
| Detection Voice Cessation | 200 to 3400 — | — — | Approximately 0.25 to 0.50 seconds Approximately 0.5 to 1.0 seconds after voice detected |
| Special Information Tones (SITs) | See Table 2. | See Table 2. | Approximately 0.25 to 0.75 seconds |
| Pager Cue Tones | 1400 | 3 to 4 tones at 0.1 to 0.125 intervals | 2 cycles of precise or any pattern of 1400-Hz signals |

Dial tone indicates that the CO is ready to accept digits from the subscriber. In the precise tone plan, dial tone consists of 350 Hz plus 440 Hz. The system reports the presence of precise dial tone after approximately 0.75 seconds of steady tone. Nonprecise dial tone is reported after the system detects a burst of raw energy lasting for approximately 3 seconds.

Busy tone indicates that the called line has been reached but it is engaged in another call. In the precise tone plan, busy tone consists of 480 Hz plus 620 Hz interrupted at 60 ipm (interruptions per minute) with a 0.5 seconds on/0.5 seconds off temporal pattern. The system reports the presence of precise busy tone after approximately two cycles of this pattern. Nonprecise busy tone is reported after three cycles.

Audible ringback (ring tone) is returned to the calling party to indicate that the called line has been reached and power ringing has started. In the precise tone plan, audible ringback consists of 440 Hz plus 480 Hz with a 2 seconds on/4 seconds off temporal pattern. The system reports the presence of precise audible ringback after two cycles of this pattern.

Outdated equipment in some areas may produce nonprecise, or dirty ringback. Nonprecise ringback is reported after two cycles of a 1 to 2.5 seconds on, 2.5 to 4.5 seconds off pattern of raw energy. The system may report dirty ringback as voice detection, unless voice detection is specifically ignored during this period. The system reports ringback cessation after 3 to 6.5 seconds of silence once ringback has been detected (depending at what point in the ringback cycle the CPA starts listening).

Reorder (Fast Busy) tone indicates that the local switching paths to the calling office or equipment serving the customer are busy or that a toll circuit is not available. In the precise tone plan, reorder consists of 480 Hz plus 620 Hz interrupted at 120 ipm (interruptions per minute) with a 0.25 seconds on/0.25 seconds off temporal pattern. The system reports the presence of precise reorder tone after two cycles of this pattern. Nonprecise reorder tone is reported after three cycles.

Voice detection has multiple uses, and can be used to detect voice as an answer condition, and also to detect machine-generated announcements that may indicate an error condition. Voice presence can be detected after approximately 0.25 to 0.5 seconds of continuous human speech falling within the 200-Hz to 3400-Hz voiceband (although the PSTN only guarantees voice performance between 300 Hz to 800 Hz. A voice cessation condition may be determined, for example, after approximately 0.5 to 1.0 seconds of silence once the presence of voice has been detected.

Special Information Tones (SITs) indicate network conditions encountered in both the Local Exchange Carrier (LEC) and Inter-Exchange Carrier (IXC) networks. The tones alert the caller that a machine-generated announcement follows (this announcement describes the network condition). Each SIT consists of a precise three-tone sequence: the first tone is either 913.8 Hz or 985.2 Hz, the second tone is either 1370.6 Hz or 1428.5 Hz, and the third is always 1776.7 Hz. The duration of the first and second tones can be either 274 ms or 380 ms, while the duration of the third remains a constant 380 ms. The names, descriptions and characteristics of the four most common SITs are summarized in Table 2.

TABLE 2

| Special Information Tones (SITs) | | First Tone Frequency Duration | | Second Tone Frequency Duration | | Third Tone Frequency Duration | |
|---|---|---|---|---|---|---|---|
| Name | Description | (Hz) | (ms) | (Hz) | (ms) | (Hz) | (ms) |
| NC[1] | No circuit found | 985.2 | 380 | 1428.5 | 380 | 1776.7 | 380 |
| IC | Operator intercept | 913.8 | 274 | 1370.6 | 274 | 1776.7 | 380 |

TABLE 2-continued

| Special Information Tones (SITs) | | First Tone Frequency Duration | | Second Tone Frequency Duration | | Third Tone Frequency Duration | |
|---|---|---|---|---|---|---|---|
| Name | Description | (Hz) | (ms) | (Hz) | (ms) | (Hz) | (ms) |
| VC | Vacant circuit (nonregistered number) | 985.2 | 380 | 1370.6 | 274 | 1776.7 | 380 |
| RO[1] | Reorder(system busy) | 913.8 | 274 | 1428.5 | 380 | 1776.7 | 380 |

[1]Tone frequencies shown indicate conditions that are the responsibility of the BOC intra-LATA carrier. Conditions occurring on inter-LATA carriers generate SITs with different first and second tone frequencies.

Pager cue tones are used by pager terminal equipment to signal callers or connected equipment to enter the callback number (this number is then transmitted to the paged party). Most pager terminal equipment manufacturers use a 3- or 4-tone burst of 1400 Hz at 100- to 125-ms intervals. The system identifies three cycles of 1400 Hz at these approximate intervals as pager cue tones. To accommodate varying terminal equipment signals, tone bursts of 1400 Hz in a variety of patterns may also be reported as pager cue tones. Voice prompts sometimes accompany pager cue tones to provide instructions. Therefore, combinations of prompts and tones may be detected by configuring an answer supervision template to respond to both voice detection and pager cue tone detection.

A Goertzel filter algorithm may be used to detect the solid tones that begin fax or data-modem calls. If any of the following tones are detected, a "modem" (fax or data) state is indicated: 2100 Hz, 2225 Hz, 1800 Hz, 2250 Hz, 1300 Hz, 1400 Hz, 980 Hz, 1200 Hz, 600 Hz, or 3000 Hz. Fax detection relies on the 1.5 seconds of HDLC flags that precede the answering fax terminal's DIS frame. DIS is used by the answering terminal to declare its capabilities. After a solid tone is detected, a V.21 receiver is used to detect the HDLC flags (01111110) in the preamble of DIS signal on the downstream side. If the required number of flags are detected, fax is reported. Otherwise, upon expiration of a timer, the call is may be determined to be a data modem communication. See, e.g., U.S. Pat. No. 7,003,093, the entirety of which is expressly incorporated herein by reference. See also, U.S. Pat. No. 7,043,006, expressly incorporated herein by reference.

Therefore, a well developed system exists for in-band signaling over audio channels, with a modest degree of complexity and some variability between standards, which themselves may change over time.

One known digital signal processor architecture, exemplified by the nVidia Tesla™ C870 GPU device, provides a massively multi-threaded architecture, providing over 500 gigaflops peak floating point performance. This device encompasses a 128-processor computing core, and is typically provided as a coprocessor on a high speed bus for a standard personal computer platform. Similarly, the AMD/ATI Firestream 9170 also reports 500 gigaflops performance from a GPU-type device with double precision floating point capability. Likewise, newly described devices (e.g., AMD Fusion) integrate a CPU and GPU on a single die with shared external interfaces. See, for example, www.nvidia.com/object/tesla_product_literature.html, S1070 1U System Specification Document (2.03 MB PDF), NVIDIA Tesla S1070 Datasheet (258 KB PDF), NVIDIA Tesla Personal Supercomputer Datasheet (517 KB PDF), C1060 Board Specification Document (514 KB PDF), NVIDIA Tesla C1060 Datasheet (153 KB PDF), NVIDIA Tesla 8 Series Product Overview (1.69 MB PDF), C870 Board Specification Document (478 KB PDF), D870 System Specification Document (630 KB PDF), S870 1U Board Specification Document (13.3 MB PDF), NVIDIA Tesla 8 Series: GPU Computing Technical Brief (3.73 MB PDF), www.nvidia.com/object/cuda_programming_tools.html (PTX: Parallel Thread Execution ISA Version 1.2), developer.download.nvidia.com/compute/cuda/2_0/docs/NVIDIA_CUDA_Programming_Guide_2.0.pdf, developer.download.nvidia.com/compute/cuda/2_0/docs/CudaReferenceManual_2.0.pdf, developer.download.nvidia.com/compute/cuda/2_0/docs/CUBLAS_Library_2.0.pdf, developer.download.nvidia.com/compute/cuda/2_0/docs/CUFFT_Library_2.0.pdf, each of which is expressly incorporated herein by reference in its entirety.

The nVidia Tesla™ GPU is supported by the Compute Unified Device Architecture (CUDA) software development environment, which provides C language support. Typical applications proposed for the nVidia Tesla™ GPU, supported by CUDA, are Parallel bitonic sort; Matrix multiplication; Matrix transpose; Performance profiling using timers; Parallel prefix sum (scan) of large arrays; Image convolution; 1D DWT using Haar wavelet; OpenGL and Direct3D graphics interoperation examples; Basic Linear Algebra Subroutines; Fast Fourier Transform; Binomial Option Pricing; Black-Scholes Option Pricing; Monte-Carlo Option Pricing; Parallel Mersenne Twister (random number generation); Parallel Histogram; Image Denoising; and a Sobel Edge Detection Filter. Therefore, the typical proposed applications are computer software profiling, matrix applications, image processing applications, financial applications, Seismic simulations; Computational biology; Pattern recognition; Signal processing; and Physical simulation. CUDA technology offers the ability for threads to cooperate when solving a problem. The nVidia Tesla™ GPUs featuring CUDA technology have an on-chip Parallel Data Cache that can store information directly on the GPU, allowing computing threads to instantly share information rather than wait for data from much slower, off-chip DRAMs. Likewise, the software compile aspects of CUDA are able to partition code between the GPU and a host processor, for example to effect data transfers and to execute on the host processor algorithms and code which are incompatible or unsuitable for efficient execution on the GPU itself.

GPU architectures are generally well-suited to address problems that can be expressed as data-parallel computations: the same program is executed on many data elements in parallel, with high arithmetic intensity, the ratio of arithmetic operations to memory operations. Because the same program is executed for each data element, there is a lower requirement for sophisticated flow control; and because it is executed on many data elements and has high arithmetic intensity, the memory access latency can be hidden with calculations instead of big data caches. Thus, the GPU architecture typically provides a larger number of arithmetic logic units than independently and concurrently operable instruction decoders. Data-parallel processing maps data elements to parallel processing threads. Many applications that process large data sets such as arrays can use a data-parallel programming model to speed up the computations. In 3D rendering large sets of pixels and vertices are mapped to parallel threads. Similarly, image and media processing applications such as post-processing of rendered images, video encoding and decoding, image scaling, stereo vision, and pattern recognition can map image blocks and pixels to parallel processing threads. In fact, many algorithms outside the field of image rendering and processing are accelerated by data-parallel processing, from general signal processing or physics simulation to computational finance or computational biology.

The Tesla™ GPU device is implemented as a set of multiprocessors (e.g., 8 on the C870 device), each of which has a Single Instruction, Multiple Data architecture (SIMD): At any given clock cycle, each processor (16 per multiprocessor on the C870) of the multiprocessor executes the same instruction, but operates on different data. Each multiprocessor has on-chip memory of the four following types: One set of local 32-bit registers per processor, a parallel data cache or shared memory that is shared by all the processors and implements the shared memory space, a read-only constant cache that is shared by all the processors and speeds up reads from the constant memory space, which is implemented as a read-only region of device memory, and a read-only texture cache that is shared by all the processors and speeds up reads from the texture memory space, which is implemented as a read-only region of device memory. The local and global memory spaces are implemented as read-write regions of device memory and are not cached. Each multiprocessor accesses the texture cache via a texture unit. A grid of thread blocks is executed on the device by executing one or more blocks on each multiprocessor using time slicing: Each block is split into SIMD groups of threads called warps; each of these warps contains the same number of threads, called the warp size, and is executed by the multiprocessor in a SIMD fashion; a thread scheduler periodically switches from one warp to another to maximize the use of the multiprocessor's computational resources. A half-warp is either the first or second half of a warp. The way a block is split into warps is always the same; each warp contains threads of consecutive, increasing thread IDs with the first warp containing thread 0. A block is processed by only one multiprocessor, so that the shared memory space resides in the on-chip shared memory leading to very fast memory accesses. The multiprocessor's registers are allocated among the threads of the block. If the number of registers used per thread multiplied by the number of threads in the block is greater than the total number of registers per multiprocessor, the block cannot be executed and the corresponding kernel will fail to launch. Several blocks can be processed by the same multiprocessor concurrently by allocating the multiprocessor's registers and shared memory among the blocks. The issue order of the warps within a block is undefined, but their execution can be synchronized, to coordinate global or shared memory accesses. The issue order of the blocks within a grid of thread blocks is undefined and there is no synchronization mechanism between blocks, so threads from two different blocks of the same grid cannot safely communicate with each other through global memory during the execution of the grid.

Telephony control and switching applications have for many years employed general purpose computer operating systems, and indeed the UNIX system was originally developed by Bell Laboratories/AT&T. There are a number of available telephone switch platforms, especially private branch exchange implementations, which use an industry standard PC Server platform, typically with specialized telephony support hardware. These include, for example, Asterisk (from Digium) PBX platform, PBXtra (Fonality), Callweaver, Sangoma, etc. See also, e.g., www.voip-info.org/wiki/. Typically, these support voice over Internet protocol (VOIP) communications, in addition to switched circuit technologies.

As discussed above, typical automated telephone signaling provides in-band signaling which therefore employs acoustic signals. A switching system must respond to these signals, or it is deemed deficient. Typically, an analog or digital call progress tone detector is provided for each channel of a switched circuit system. For VOIP systems, this functionality maybe provided in a gateway (media gateway), either as in traditional switched circuit systems, or as a software process within a digital signal processor.

Because of the computational complexity of the call progress tone analysis task, the density of digital signal processing systems for simultaneously handling a large number of voice communications has been limited. For example, 8 channel call progress tone detection may be supported in a single Texas Instruments TMS320C5510™ digital signal processor (DSP). See, IP PBX Chip from Adaptive Digital Technologies, Inc. (www.adaptivedigital.com/product/solution/ip_pbx.htm). The tone detection algorithms consume, for example, over 1 MIPS per channel for a full suite of detection functions, depending on algorithm, processor architecture, etc. Scaling to hundreds of channels per system is cumbersome, and typically requires special purpose dedicated, and often costly, hardware which occupy a very limited number of expansion bus slots of a PBX system.

SUMMARY OF THE INVENTION

The present system and method improve the cost and efficiency of real time digital signal processing with respect to analog signals, and in particular, telephony signaling functions.

In one aspect of the invention, a massively parallel digital signal processor is employed to perform telephony in-band signaling detection and analysis. In another aspect, a massively parallel coprocessor card is added to a telephony server which is executed on a standard processor to increase call progress tone detection performance. Advantageously, the massively parallel processor is adapted to execute standard software, such as C language, and therefore may perform both massively parallel tasks, and with a likely lower degree of efficiency, serial execution tasks as well. Thus, a telephony system may be implemented on a single processor system, or within a distributed and/or processor/coprocessor architecture.

Data blocks, each including a time slice from a single audio channel, are fed in parallel to the massively parallel processor, which performs operations in parallel on a plurality of time slices, generally executing the same instruction on the plurality of time slices. In this system, real time performance may be effectively achieved, with a predetermined maximum processing latency. In many cases, it is not necessary to detect tones on each audio channel continuously, and therefore the system may sample each channel sequentially. In addition, if a Fast Fourier Transform-type algorithm is employed, the real (I) and imaginary (Q) channels may each be presented with data from different sources, leading to a doubling of capacity. Thus, for example, using an nVidia Tesla™ C870 GPU, with 128 processors, each processor can handle 8 (real only) or 16 (real and imaginary) audio channels, leading to a density of 1024 or 2048 channel call progress tone detection. Practically, the system is not operated at capacity, and therefore up to about 800 voice channels may be processed, using a general purpose commercially available coprocessor card for a PC architecture.

For example, a PC architecture server executes Asterisk PBX software under the Linux operating system. A call is provided from the Asterisk PBX software to a dynamic linked library (DLL), which transfers data from a buffer in main memory containing time slices for the analog channels to be processed. For example, 2 mS each for 800 channels, at an 8.4 kHz sampling rate is provided (132 kB) in the buffer. The buffer contents is transferred to the coprocessor through a PCIe x16 interface, along with a call to perform an FFT for each channel, with appropriate windowing, and/or using continuity from prior samples. The FFT may then be filtered on the coprocessor, with the results presented to the host processor, or the raw FFT data transferred to the host for filtering. Using a time-to-frequency domain transform, the signal energy at a specified frequency is converted to an amplitude peak at a specific frequency bin, which is readily extracted. Temporal analysis may also be performed in either the coprocessor or processor, though preferably this is performed in the processor. The analysis and data transform may also be used for speech recognition primitives, and for other processes.

A particular advantage of this architecture arises from the suitability of the call progress tone analysis to be performed in parallel, since the algorithm is deterministic and has few or no branch points. Thus, the task is defined to efficiently exploit the processing power and parallelism of a massively parallel processor.

DETAILED DESCRIPTION OF THE PREFERRED EMBODIMENTS

Figure 1:
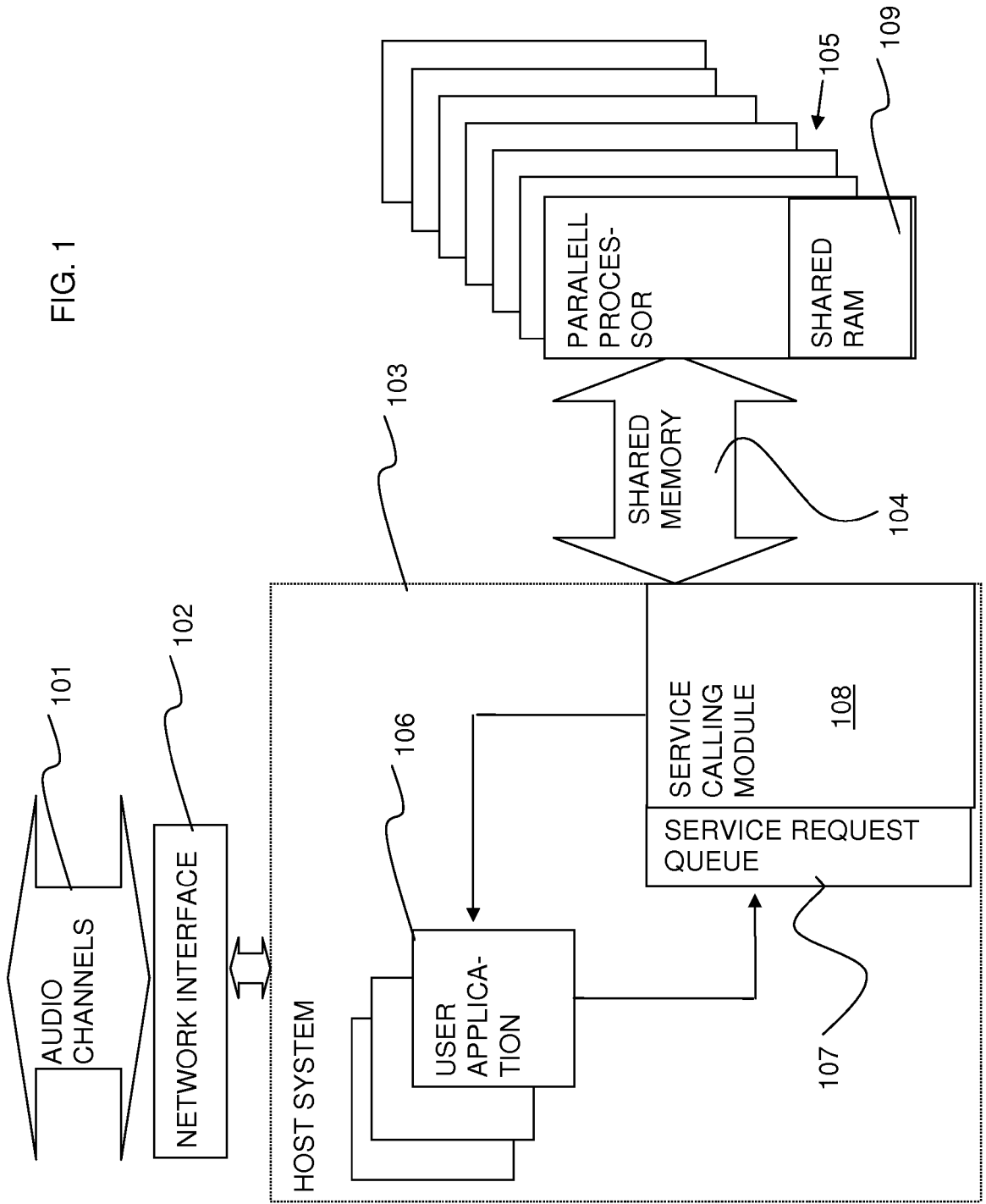
FIG. 1 is a schematic diagram of a system for implementing the invention.

One embodiment of the present invention provides a system and method for analyzing call progress tones and performing other types of audio band processing on a plurality of voice channels, for example in a telephone system. Examples of call progress tone analysis can be found at: www.commetrex.com/products/algorithms/CPA.html; www.dialogic-.com/network/csp/appnots/10117_CPA_SR6_HMP2.pdf; whitepapers.zdnet.co.uk/0,1000000651,260123088p, 00.htm; and www.pikatechnologies.com/downloads/samples/readme/6.2%20-%20Call%20Progress%20Analysis%20-%20ReadMe.txt, each of which is expressly incorporated herein by reference.

In a modest size system for analyzing call progress tones, there may be hundreds of voice channels to be handled are simultaneously. Indeed, the availability of a general purpose call progress tone processing system permits systems to define non-standard or additional signaling capabilities, thus reducing the need for out of band signaling. Voice processing systems generally require real time performance; that is, connections must be maintained and packets or streams forwarded within narrow time windows, and call progress tones processed within tight specifications.

An emerging class of telephone communication processing system, implements a private branch exchange (PBX) switch, which employs a standard personal computer (PC) as a system processor, and employs software which executes on a general purpose operating system (OS). For example, the Asterisk system runs on the Linux OS. More information about Asterisk may be found at Digium/Asterisk, 445 Jan Davis Drive NW, Huntsville, Ala. 35806, 256.428.6000<<http:>>//asterisk.org/downloads. Another such system is: "Yate" (Yet Another Telephony Engine), available from Bd. Nicolae Titulescu 10, Bl. 20, Sc. C, Ap. 128 Sector 1, Bucharest, Romania yate.null.ro/pmwiki/index.php?n=Main.Download.

In such systems, scalability to desired levels, for example hundreds of simultaneous voice channels, requires that the host processor have sufficient headroom to perform all required tasks within the time allotted. Alternately stated, the tasks performed by the host processor should be limited to those it is capable of completing without contention or undue delay. Because digitized audio signal processing is resource intensive, PC-based systems have typically not implemented functionality, which requires per-channel signal processing, or offloaded the processing to specialized digital signal processing (DSP) boards. Further, such DSP boards are themselves limited, for example 8-16 voice processed channels per DSP core, with 4-32 cores per board, although higher density boards are available. These boards are relatively expensive, as compared to the general purpose PC, and occupy a limited number of bus expansion slots.

The present invention provides an alternate to the use of specialized DSP processors dedicated to voice channel processing. According to one embodiment, a massively parallel processor as available in a modern video graphics processor (though not necessarily configured as such) is employed to perform certain audio channel processing tasks, providing substantial capacity and versatility. One example of such a video graphics processor is the nVidia Tesla™ GPU, using the CUDA software development platform ("GPU"). This system provides 8 banks of 16 processors (128 processors total), each processor capable of handling a real-time fast Fourier transform (FFT) on 8-16 channels. For example, the FFT algorithm facilitates subsequent processing to detect call progress tones, which may be detected in the massively parallel processor environment, or using the host processor after downloading the FFT data. One particularly advantageous characteristic of implementation of a general purpose FFT algorithm rather than specific call tone detection algorithms is that a number of different call tone standards (and extensions/variants thereof) may be supported, and the FFT data may be used for a number of different purposes, for example speech recognition, etc.

Likewise, the signal processing is not limited to FFT algorithms, and therefore other algorithms may also or alternately be performed. For example, wavelet based algorithms may provide useful information.

The architecture of the system provides a dynamic link library (DLL) available for calls from the telephony control software, e.g., Asterisk. An application programming interface (API) provides communication between the telephony control software (TCS) and the DLL. This TCS is either unmodified or minimally modified to support the enhanced functionality, which is separately compartmentalized.

The TCS, for example, executes a process which calls the DLL, causing the DLL to transfer a data from a buffer holding, e.g., 2 mS of voice data for, e.g., 800 voice channels, from main system memory of the PC to the massively parallel coprocessor (MPC), which is, for example an nVidia Tesla™ platform. The DLL has previously uploaded to the MPC the algorithm, which is, for example, a parallel FFT algorithm, which operates on all 800 channels simultaneously. It may, for example, also perform tone detection, and produce an output in the MPC memory of the FFT-representation of the 800 voice channels, and possibly certain processed information and flags. The DLL then transfers the information from the MPC memory to PC main memory for access by the TCS, or other processes, after completion.

While the MPC has massive computational power, it has somewhat limited controllability. For example, a bank of 16 DSPs in the MPC are controlled by a single instruction pointer, meaning that the algorithms executing within the MPC are generally not data-dependent in execution, nor have conditional-contingent branching, since this would require each thread to execute different instructions, and thus dramatically reduce throughput. Therefore, the algorithms are preferably designed to avoid such processes, and should generally be deterministic and non-data dependent algorithms. On the other hand, it is possible to perform contingent or data-dependent processing, though the gains from the massively parallel architecture are limited, and thus channel specific processing is possible. Advantageously, implementations of the FFT algorithm are employed which meet the requirements for massively parallel execution. For example, the CUDA™ technology environment from nVidia provides such algorithms. Likewise, post processing of the FFT data to determine the presence of tones poses a limited burden on the processor(s), and need not be performed under massively parallel conditions. This tone extraction process may therefore be performed on the MPC or the host PC processor, depending on respective processing loads and headroom.

In general, the FFT itself should be performed in faster-than real-time manner. For example, it may be desired to implement overlapping FFTs, e.g., examining 2 mS of data every 1 mS, including memory-to-memory transfers and associated processing. Thus, for example, it may be desired to complete the FFT of 2 mS of data on the MPC within 0.5 mS. Assuming, for example, a sampling rate of 8.4 kHz, and an upper frequency within a channel of 3.2-4 kHz, the 2 mS sample, would generally imply a 256 point FFT, which can be performed efficiently and quickly on the nVidia Tesla™ platform, including any required windowing and post processing.

Therefore, the use of the present invention permits the addition of call progress tone processing and other per channel signal processing tasks to a PC based TCS platform without substantially increasing the processing burden on the host PC processor, and generally permits such a platform to add generic call progress tone processing features and other per channel signal processing features without substantially limiting scalability.

Other sorts of parallel real time processing are also possible, for example analysis of distributed sensor signals such as "Motes" or the like. See, en.wikipedia.org/wiki/Smartdust. The MPC may also be employed to perform other telephony tasks, such as echo cancellation, conferencing, tone generation, compression/decompression, caller ID, interactive voice response, voicemail, packet processing and packet loss recovery algorithms, etc.

Similarly, simultaneous voice recognition can be performed on hundreds of simultaneous channels, for instance in the context of directing incoming calls based on customer responses at a customer service center. Advantageously, in such an environment, processing of particular channels maybe switched between banks of multiprocessors, depending on the processing task required for the channel and the instructions being executed by the multiprocessor. Thus, to the extent that the processing of a channel is data dependent, but the algorithm has a limited number of different paths based on the data, the MPC system may efficiently process the channels even where the processing sequence and instructions for each channel is not identical.

FIG. 1 shows a schematic of system for implementing the invention.

Massively multiplexed voice data 101 is received at network interface 102. The network could be a LAN, Wide Area Network (WAN), Prime Rate ISDN (PRI), a traditional telephone network with Time Division Multiplexing (TDM), or any other suitable network. This data may typically include hundreds of channels, each carrying a separate conversation and also routing information. The routing information may be in the form of in-band signaling of dual frequency (DTMF) audio tones received from a telephone keypad or DTMF generator. The channels may be encoded using digital sampling of the audio input prior to multiplexing. Typically voice channels will come in 20 ms frames.

The system according to a preferred coprocessor embodiment includes at least one host processor 103, which may be programmed with telephony software such as Asterisk or Yate, cited above. The host processor may be of any suitable type, such as those found in PCs, for example Intel Pentium Core 2 Duo or Quadra, or AMD Athlon X2. The host processor communicates via shared memory 104 with MPC 105, which is, for example 2 GB or more of DDR2 or DDR3 memory.

Within the host processor, application programs 106 receive demultiplexed voice data from interface 102, and generate service requests for services that cannot or are desired not to be processed in real time within the host processor itself. These service requests are stored in a service request queue 107. A service calling module 108 organizes the service requests from the queue 107 for presentation to the MPC 105.

The module 108 also reports results back to the user applications 106, which in turn put processed voice data frames back on the channels in real time, such that the next set of frames coming in on the channels 101 can be processed as they arrive.

Figure 2:
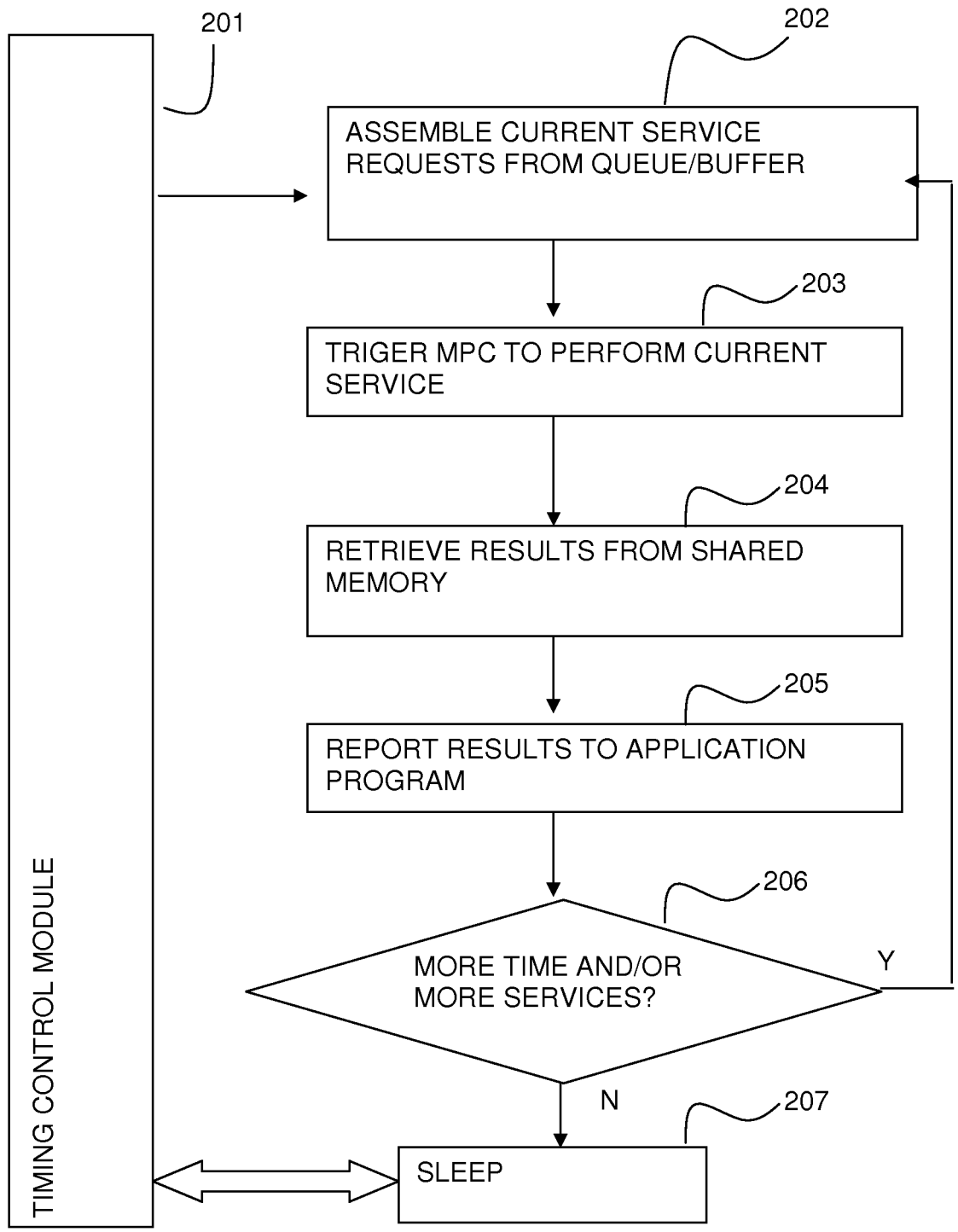
FIG. 2 is a flowchart of operations within a host processor
Figure 3:
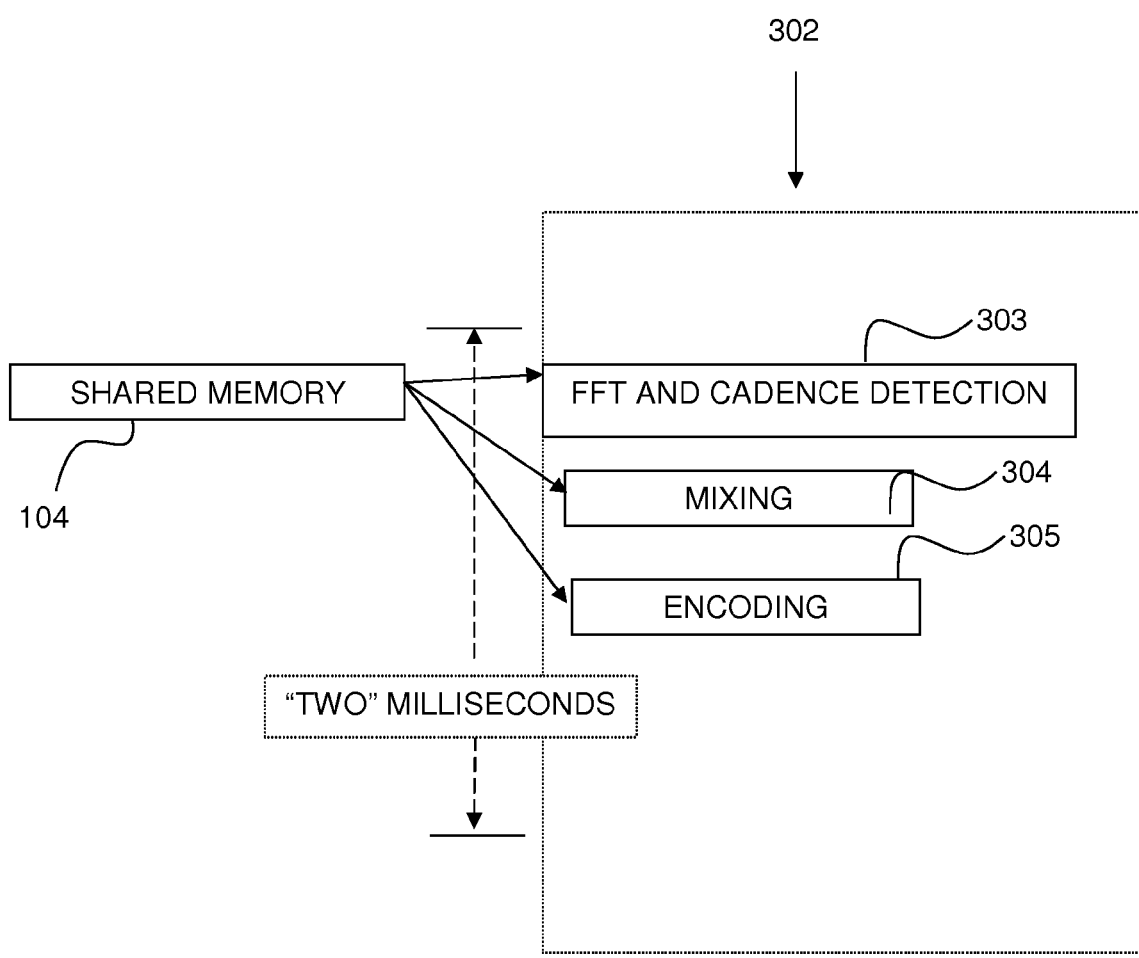
FIG. 3 is a schematic diagram showing operations with respect to a massively parallel co-processor.

FIG. 2 shows a process within module 108. In this process, a timing module 201 keeps track of a predetermined real time delay constraint. Since standard voice frames are 20 ms long, this constraint should be significantly less than that to allow operations to be completed in real time. A 5-10 ms delay would very likely be sufficient; however a 2 ms delay would give a degree of comfort that real time operation will be assured. Then, at 202, e blocks of data requesting service are organized into the queue or buffer. At 203, the service calling module examines the queue to see what services are currently required. Some MPC's, such as the nVidia Tesla™ C870 GPU, require that each processor within a multiprocessor of the MPC perform the same operations in lockstep. For such MPC's, it will be necessary to choose all requests for the same service at the same time. For instance, all requests for an FFT should be grouped together and requested at once. Then all requests for a Mix operation might be grouped together and requested after the FFT's are completed—and so forth. The MPC 105 will perform the services requested and provide the results returned to shared memory 104. At 204, the service calling module will retrieve the results from shared memory and at 205 will report the results back to the application program. At 206, it is tested whether there is more time and whether more services are requested. If so, control returns to element 202. If not, at 207, the MPC is triggered to sleep (or be available to other processes) until another time interval determined by the real time delay constraint is begun, FIG. 3 shows an example of running several processes on data retrieved from the audio channels. The figure shows the shared memory 104 and one of the processors 302 from the MPC 105. The processor 302 first retrieves one or more blocks from the job queue or buffer 104 that are requesting an FFT and performs the FFT on those blocks. The other processors within the same multiprocessor array of parallel processors are instructed to do the same thing at the same time (on different data). After completion of the FFT, more operations can be performed. For instance, at 304 and 305, the processor 302 checks shared memory 104 to see whether more services are needed. In the examples given, mixing 304 and decoding 305 are requested by module 109, sequentially. Therefore these operations are also performed on data blocks retrieved from the shared memory 104. The result or results of each operation are placed in shared memory upon completion of the operation, where those results are retrievable by the host processor.

In the case of call progress tones, these three operations together: FFT, mixing, and decoding, will determine the destination of a call associated with the block of audio data for the purposes of telephone switching.

If module 108 sends more request for a particular service than can be accommodated at once, some of the requests will be accumulated in a shared RAM 109 to be completed in a later processing cycle. The MPC will be able to perform multiple instances of the requested service within the time constraints imposed by the loop of FIG. 2. Various tasks may be assigned priorities, or deadlines, and therefore the processing of different services may be selected for processing based on these criteria, and need not be processed in strict order.

It is noted that the present invention is not limited to nVidia Tesla® parallel processing technology, and may make use of various other technologies. For example, the Intel Larrabee GPU technology, which parallelizes a number of P54C processors, may also be employed, as well as ATI CTM technology (ati.amd.com/technology/streamcomputing/index.html, ati.amd.com/technology/streamcomputing/resources.html, each of which, including linked resources, is expressly incorporated herein by reference), and other known technologies.

The following is some pseudo code illustrating embodiments of the invention as implemented in software. The disclosure of a software embodiment does not preclude the possibility that the invention might be implemented in hardware.

Embodiment #1

The present example provides computer executable code, which is stored in a computer readable medium, for execution on a programmable processor, to implement an embodiment of the invention. The computer is, for example, an Intel dual core processor based machine, with one or more nVidia Tesla® compatible cards in PCIe x16 slots, for example, nVidia C870 or C1060 processor. The system typically stores executable code on a SATA-300 interface rotating magnetic storage media, i.e., a so-called hard disk drive, though other memory media, such as optical media, solid state storage, or other known computer readable media may be employed. Indeed, the instructions may be provided to the processors as electromagnetic signals communicated through a vacuum or conductive or dielectric medium. The nVidia processor typically relies on DDR3 memory, while the main processor typically relies on DDR2 memory, though the type of random access memory is non-critical. The telephony signals for processing may be received over a T1, T3, optical fiber, Ethernet, or other communications medium and/or protocol.

Data structures to be used by module 108

```
RQueueType Structure      // Job Request Queue
    ServiceType
    ChannelID             // Channel Identifier
    VoiceData             // Input Data
    Output                // Output Data
End Structure
```

```
// This embodiment uses a separate queue for each type of service to be requested.
// The queues have 200 elements in them. This number is arbitrary and could be adjusted
// by the designer depending on anticipated call volumes and numbers of processors available
// on the MPC. Generally the number does not have to be as large as the total of number
// of simultaneous calls anticipated, because not all of those calls will be requesting services
// at the same time.
RQueueType RQueueFFT[200]    // Maximum of 200 Requests FFT
RQueueType RQueueMIX[200]    // Maximum of 200 Requests MIX
RQueueType RQueueENC[200]    // Maximum of 200 Requests ENC
RQueueType RQueueDEC[200]    // Maximum of 200 Requests DEC
```

Procedures to be Used by Module 108

```
// Initialization Function
    Init:   Initialize Request Queue
            Initialize Service Entry
            Start Service Poll Loop
// Service Request Function
    ReqS:   Case ServiceType
            FFT:  Lock RQueueFFT
                  Insert Service Information into RQueueFFT
                  Unlock RQueueFFT
            MIX:  Lock RQueueMIX
                  Insert Service Information into RQueueMIX
                  Unlock RQueueMIX
            ENC:  Lock RQueueENC
                  Insert Service Information into RQueueENC
                  Unlock RQueueENC
            DEC:  Lock RQueueDEC
                  Insert Service Information into RQueueDEC
                  Unlock RQueueDEC
            End Case
            Wait for completion of Service
            Return output
// Service Poll Loop
// This loop is not called by the other procedures. It runs independently. It
// will keep track of where the parallel processors are in their processing.
// The host will load all the requests for a particular service into the buffer.
// Then it will keep track of when the services are completed and
// load new requests into the buffer.
//
SerPL: Get timestamp and store in St
    // Let's do FFT/FHT
    Submit RQueueFFT with FFT code to GPU
    For all element in RQueueFFT
        Signal Channel of completion of service
    End For
    // Let's do mixing
    Submit RQueueMIX with MIXING code to GPU
    For all element in RQueueMIX
        Signal Channel of completion of service
    End For
    // Let's do encoding
    Submit RQueueENC with ENCODING code to GPU
    For all element in RQueueENC
        Signal Channel of completion of service
    End For
    // Let's do decoding
    Submit RQueueDEC with DECODING code to GPU
    For all element in RQueueDEC
        Signal Channel of completion of service
    End For
    // Make sure it takes the same amount of time for every pass
    Compute time difference between now and St
    Sleep that amount of time
    Goto SerPL                  // second pass
```

Examples of Code in Application Programs 106 for Calling the Routines Above

Example for Calling "Init"

```
// we have initialize PStar before we can use it
Call Init
```

Example for Requesting an FFT

```
// use FFT service for multitone detection
Allocate RD as RQueueType
RD.Service = FFT
RD.ChannelID = Current Channel ID
RD.Input = Voice Data
Call ReqS(RD)
Scan RD.Output for presence of our tones
```

Example for Requesting Encoding

```
// use Encoding service
Allocate RD as RQueueType
RD.Service = ENCODE
RD.ChannelID = Current Channel ID
RD.Input = Voice Data
Call ReqS(RD)
// RD.Output contains encoded/compressed data
```

Example for Requesting Decoding

```
// use Decoding service
Allocate RD as RQueueType
RD.Service = DECODE
RD.ChannelID = Current Channel ID
RD.Input = Voice Data
Call ReqS(RD)
// RD.Output contains decoded data
```

Embodiment #2

The second embodiment may employ similar hardware to the first embodiment.
//This embodiment is slower, but also uses less memory than embodiment #1 above Data structures to be used by module 108

```
RQueueType Structure        // Job Request Queue
    ServiceType
    ChannelID               // Channel Identifier
    VoiceData               // Input Data
```

-continued

```
        Output          // Output Data
    End Structure
    // This embodiment uses a single queue, but stores other data in a
    // temporary queue when the single queue is not available. This is
    less memory intensive, but slower.
    RQueueType RQueue[200]    // Maximum of 200 Requests
```

Procedures to be Used by Module 108

```
// Initialization Function
Init:   Initialize Request Queue
        Initialize Service Entry
        Start Service Poll Loop
// Service Request Function
ReqS:   Lock RQueue
        Insert Service Information into RQueue
        Unlock RQueue
        Wait for completion of Service
        Return output
// Service Poll Loop
// to run continuously
SerPL: Get timestamp and store in St
        // Let's do FFT/FHT
        For all element in RQueue where SerivceType = FFT
            Copy Data To TempRQueue
        End For
        Submit TempRQueue with FFT code to GPU
        For all element in TempRQueue
            Move TempRQueue.output to RQueue.output
            Signal Channel of completion of service
        End For
        // Let's do mixing
        For all element in RQueue where SerivceType = MIXING
            Copy Data To TempRQueue
        End For
        Submit TempRQueue with MIXING code to GPU
        For all element in RQueue
            Move TempRQueue.output to RQueue.output
            Signal Channel of completion of service
        End For
        // Let's do encoding
        For all element in RQueue where SerivceType = ENCODE
            Copy Data To TempRQueue
        End For
        Submit TempRQueue with ENCODING code to GPU
        For all element in RQueue
            Move TempRQueue.output to RQueue.output
            Signal Channel of completion of service
        End For
        // Let's do decoding
        For all element in RQueue where SerivceType = DECODE
            Copy Data To TempRQueue
        End For
        Submit TempRQueue with DECODING code to GPU
        For all element in RQueue
            Move TempRQueue.output to RQueue.output
            Signal Channel of completion of service
        End For
        // Make sure it takes the same amount of time for every pass
        Compute time difference between now and St
        Sleep that amount of time
        Goto SerPL              // second pass
```

Examples of Code in the Application Programs 106 for Calling the Routines Above Example for Calling "init"

```
        // we have initialize PStar before we can use it
        Call Init
```

Example for Calling "FFT"

```
        // use FFT service for multitone detection
        Allocate RD as RQueueType
        RD.Service = FFT
        RD.ChannelID = Current Channel ID
        RD.Input = Voice Data
        Call ReqS(RD)
        Scan RD.Output for presents of our tones
```

Example for Calling Encoding

```
        // use Encoding service
        Allocate RD as RQueueType
        RD.Service = ENCODE
        RD.ChannelID = Current Channel ID
        RD.Input = Voice Data
        Call ReqS(RD)
        // RD.Output contains encoded/compressed data
```

Example for Calling Decoding

```
        // use Decoding service
        Allocate RD as RQueueType
        RD.Service = DECODE
        RD.ChannelID = Current Channel ID
        RD.Input = Voice Data
        Call ReqS(RD)
        // RD.Output contains decoded data
```

While the embodiment discussed above uses a separate host and massively parallel processing array, it is clear that the processing array may also execute general purpose code and support general purpose or application-specific operating systems, albeit with reduced efficiency as compared to an unbranched signal processing algorithm. Therefore, it is possible to employ a single processor core and memory pool, thus reducing system cost and simplifying system architecture. Indeed, one or more multiprocessors may be dedicated to signal processing, and other(s) to system control, coordination, and logical analysis and execution. In such a case, the functions identified above as being performed in the host processor would be performed in the array, and, of course, the transfers across the bus separating the two would not be required.

From a review of the present disclosure, other modifications will be apparent to persons skilled in the art. Such modifications may involve other features which are already known in the design, manufacture and use of telephony engines and parallel processing and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. The word "or" should be construed as an inclusive or, in other words as "and/or".

The invention claimed is:

1. A method comprising:
receiving data representing a plurality of audio data channels to be processed by a multiprocessor having a plurality of arithmetic logic units controlled together under control of a common instruction execution control unit to execute each of a common series of instructions issued by the common instruction execution control unit in synchrony;
subjecting each of the data representing the plurality of audio data channels to processing in accordance with a common algorithm, having synchronized operations, wherein each data channel is separately processed in parallel; and
storing an algorithm processing result in a memory for each of the plurality of audio data channels.

2. The method according to claim 1, wherein the audio data channels comprise telephone communications, and the common algorithm comprises a call progress tone analysis algorithm.

3. The method according to claim 1, wherein the common algorithm executes substantially without data-dependent conditional execution branch instructions.

4. The method according to claim 1, wherein the common algorithm executes substantially without interaction between respective audio data channels.

5. The method according to claim 1, wherein the multiprocessor is provided as a coprocessor to a general purpose processor, further comprising the step of transferring the stored algorithm processing result from a first memory device associated with the multiprocessor to a second memory device associated with the general purpose processor.

6. The method according to claim 1, wherein the common algorithm comprises a call progress tone detection algorithm, further comprising the step of selectively producing a response to a detected call progress tone represented in at least one audio data channel.

7. The method according to claim 1, wherein the common algorithm comprises a time-frequency domain transform.

8. The method according to claim 1, further comprising the step of processing the corresponding audio data channel in dependence on the algorithm processing result.

9. The method according to claim 1, further comprising the step of switching an audio data channel in dependence on the algorithm processing result associated with that channel.

10. The method according to claim 1, wherein the common algorithm processing result is employed to perform speech recognition for a respective audio data channel.

11. The method according to claim 1, wherein the multiprocessor performs an audio conferencing function in which a plurality of audio channels are processed to provide real time interactive communications between at least three audio participants.

12. The method according to claim 1, wherein the common algorithm comprises a Goertzel filter algorithm.

13. The method according to claim 1, wherein the multiprocessor processes sequential timeslices of each of a plurality of audio data channels with real-time throughput.

14. The method according to claim 1, wherein the multiprocessor is part of a graphic processing unit which serves as a coprocessor to at least one main general purpose processor, further comprising the step of using the stored processing result to control a telephone switching system.

15. The method according to claim 1,
wherein the data representing the plurality of audio data channels are in-band signals within a plurality of communication channels, and comprise a continuous portion of digitized data for each of a plurality of timeslices of a communication channel; and
wherein instructions for controlling the common algorithm are stored in a memory adapted to store at least one instruction sequence for the multiprocessor, defining an algorithm adapted to processes each timeslice to produce at least one of processed data and at least one data processing result;
further comprising representing the at least one of processed data and at least one data processing result for each respective timeslice as a signal at an output.

16. The method according to claim 15, further comprising organizing data from the plurality of communication channels into blocks; and selectively processing respective ones of the plurality of communication channels responsive to the results of the at least one data processing result, wherein the multiprocessor comprises having a common instruction decode unit for each of a plurality of arithmetic logic units within a respective multiprocessor, which simultaneously execute the common algorithm on data derived from respective ones of a plurality of communication channels.

17. The method according to claim 15, wherein the plurality of communication channels comprise a plurality of audio channels, data for each audio channel being analyzed by the multiprocessor to identify at least one in-band audio frequency signal, and a host processor processes each respective audio channel in dependence on a respective identification of the at least one in-band audio frequency signal for that respective audio channel to control a telecommunication switching process.

18. The apparatus according to claim 15, wherein the common algorithm comprises at least a conferencing function and a control signal recognition function, wherein a plurality of separate communication channels are merged into a common output stream in real-time, and controlled in dependence on control signals contained in ones of the communication channels.

19. A method comprising:
receiving data representing a plurality of audio data channels to be processed by a multiprocessor having a plurality of arithmetic logic units controlled together under control of a common control unit responding to a set of instructions for simultaneously controlling the plurality of arithmetic logic units;
performing a common algorithm on the received data representing each of the plurality of audio data channels based on the set of instructions to simultaneously produce transformed data representing a plurality of processed audio data channels;
determining characteristics of the transformed data for each audio data channel through a logical analysis of the respective transformed data, wherein a sequence within the logical analysis is dependent on the respective transformed data; and
producing a control signal dependent on at least one respective characteristic of a respective audio data channel.

20. An apparatus comprising:
an input port configured to receive data representing a plurality of audio data channels;
a multiprocessor having a plurality of arithmetic logic units controlled together under control of a common instruction execution control unit, configured to:

receive the data representing a plurality of audio data channels;

subject each of the data representing the plurality of audio data channels to processing in accordance with a common algorithm comprising a sequence of instructions from the common instruction execution control unit which are executed in synchrony by each of the plurality of arithmetic logic units, wherein each data channel is separately processed in parallel by the plurality of arithmetic logic units; and a memory configured to receive and store an algorithm processing result for each of the plurality of audio data channels, from the multiprocessor.

* * * * *